(12) United States Patent
Kaneda

(10) Patent No.: US 6,701,481 B2
(45) Date of Patent: Mar. 2, 2004

(54) RECORDING APPARATUS, RECORDING SYSTEM AND ERROR NOTIFICATION METHOD

(75) Inventor: Satoru Kaneda, Tokyo (JP)

(73) Assignee: NEC Corporation, Tokyo (JP)

( * ) Notice: Subject to any disclaimer, the term of this patent is extended or adjusted under 35 U.S.C. 154(b) by 538 days.

(21) Appl. No.: 09/773,749

(22) Filed: Feb. 2, 2001

(65) Prior Publication Data

US 2001/0014961 A1 Aug. 16, 2001

(30) Foreign Application Priority Data

Feb. 2, 2000 (JP) .................................. 2000-024561

(51) Int. Cl.[7] .................. G11B 20/18; G06F 12/16; H03M 13/03; H03M 13/37; H03M 13/47
(52) U.S. Cl. ........................ 714/765; 714/769
(58) Field of Search .................... 714/765, 769

(56) References Cited

U.S. PATENT DOCUMENTS

| | | | | |
|---|---|---|---|---|
| 5,574,735 A | * | 11/1996 | Takada et al. | 714/785 |
| 5,841,793 A | * | 11/1998 | Fukuda | 714/752 |
| 5,867,510 A | * | 2/1999 | Steele | 714/758 |
| 5,920,577 A | * | 7/1999 | Ichimura et al. | 714/752 |
| 5,943,347 A | * | 8/1999 | Shepard | 714/747 |
| 6,415,411 B1 | * | 7/2002 | Nakamura | 714/755 |
| 6,421,802 B1 | * | 7/2002 | Schildbach et al. | 714/747 |

FOREIGN PATENT DOCUMENTS

JP 03-235589 10/1991

* cited by examiner

*Primary Examiner*—R. Stephen Dildine
(74) *Attorney, Agent, or Firm*—Sughrue Mion, PLLC

(57) ABSTRACT

A recording apparatus is provided with a recording medium, an error correction circuit and an error processing circuit. The error correction circuit corrects errors in read data which are read from the recording medium. The error processing circuit inserts a data pattern in data which are output from the error correction circuit in a case where a missing error remains in the data. The data pattern indicates that the missing error remains.

47 Claims, 13 Drawing Sheets

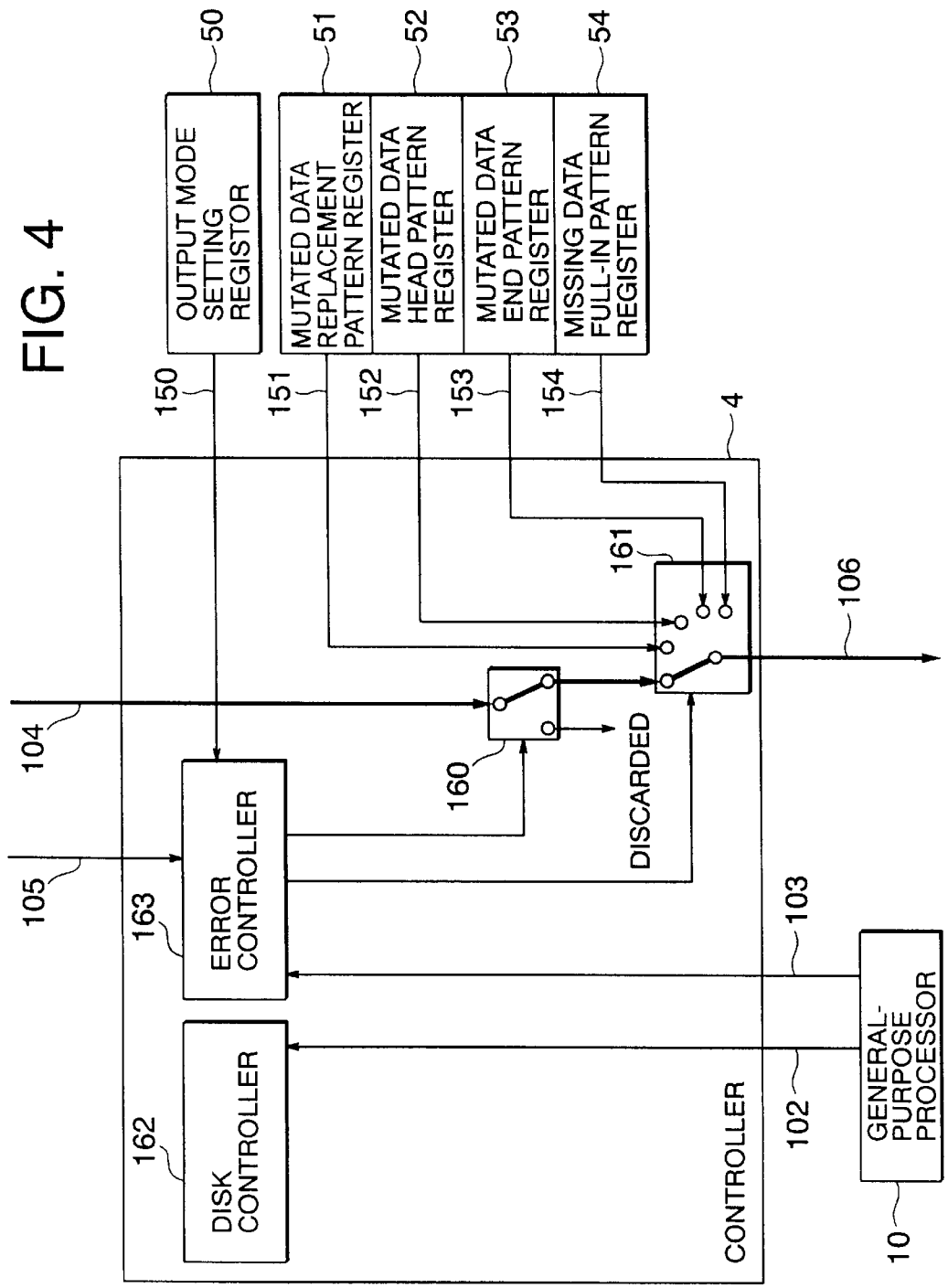

FIG. 5

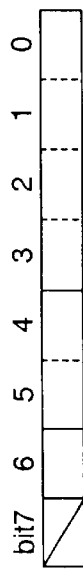

| bit3 | bit2 | bit1 | bit0 | DIFINITION (MODE SETTING IN THE EVENT OF MUTATION ERROR) |
|---|---|---|---|---|
| 0 | 0 | x | x | IN THE EVENT OF MUTATION ERROR, DATA INCLUDING THE MUTATED DATA ARE REMOVED AND THE REST IS OUTPUT. |
| 0 | 1 | 0 | 0 | IN THE EVENT OF MUTATION ERROR, DATA INCLUDING THE MUTATED DATA ARE OUTPUT AS A WHOLE (NO INSERTION). |
| 0 | 1 | 0 | 1 | IN THE EVENT OF MUTATION ERROR, DATA INCLUDING THE MUTATED DATA ARE OUTPUT AS A WHOLE (HEAD PATTERN IS INSERTED). |
| 0 | 1 | 1 | 0 | IN THE EVENT OF MUTATION ERROR, DATA INCLUDING THE MUTATED DATA ARE OUTPUT AS A WHOLE (END PATTERN IS INSERTED). |
| 0 | 1 | 1 | 1 | IN THE EVENT OF MUTATION ERROR, DATA INCLUDING THE MUTATED DATA ARE OUTPUT AS A WHOLE (HEAD PATTERN AND END PATTERN ARE INSERTED). |
| 1 | x | x | x | IN THE EVENT OF MUTATION ERROR, DATA INCLUDING THE MUTATED DATA ARE REPLACED WITH A REPLACEMENT PATTERN AND ARE OUTPUT. |

| bit5 | bit4 | DIFINITION (MODE SETTING IN THE EVENT OF MISSING ERROR) |
|---|---|---|
| 0 | 0 | IN THE EVENT OF MISSING ERROR, FILL-IN DATA IS NOT INSERTED. |
| 0 | 1 | IN THE EVENT OF MISSING ERROR, ONE SET OF FILL-IN DATA IS INSERTED. |
| 1 | x | IN THE EVENT OF MISSING ERROR, FILL-IN DATA OF THE SAME SIZE AS THAT OF THE MISSING DATA IS INSERTED. |

| bit6 | DIFINITION (MODE SETTING IN THE EVENT OF ERROR IN GENERAL) |
|---|---|
| 0 | IN THE EVENT OF ERROR, READING OPERATION IS INTERRUPTED. |
| 1 | IN THE EVENT OF ERROR, READING OPERATION IS NOT INTERRUPTED. |

RECORDING APPARATUS, RECORDING SYSTEM AND ERROR NOTIFICATION METHOD

BACKGROUND OF THE INVENTION

1. Field of the Invention

The present invention relates to a recording apparatus and a recording system having a disk-shaped recording medium or the like, and an error notification method used in the same, and particularly to a recording apparatus, a recording system and an error notification method that are preferably used in recording audio signals and moving pictures.

2. Description of the Related Art

A disk drive, which is one type of recording apparatus, receives input and output commands such as read command and write command through a disk interface, and records data in a specified recording area (sector) or reads data from a specified recording area (sector).

The disk drive incorporates a recording medium. The recording medium is divided into divisions called tracks having concentric or spiral configuration. The track is further divided into divisions of the same lengths called sectors. Data are recorded in the sectors. While the recording medium is rotating, a head disposed to oppose the surface of the recording medium is moved by an actuator in the radial direction of the recording medium thereby to position the head above a target location of the recording medium, where the data are read or written.

However, signal level recorded on the recording medium may deteriorate. Positioning of the head may also fail due to mechanical vibration or electrical noise generated when reading or writing the data. Thus one often encounters missing error where a part of the data could not be read and is not represented, or mutation error where read data or written data is misrepresented to have a value different from the true value.

In the prior art, as measures to solve the problem of missing error or mutation error, error control code (ECC) is written in the recording medium for detecting and correcting errors, in addition to the contents data.

In this case, when an error is found in the contents data with the error control code that has been read, correction is attempted by means of an error correction circuit. When the error cannot be corrected by this operation, an error detection signal is output.

In a case where the error correction circuit fails to correct the error, error processing means makes an attempt to read the data again, repeating the attempt till correctable data are successfully read. In a case where the error cannot be corrected after a certain number of retrials, the error correcting means determines that a data error has occurred.

A number of disk drives such as that described above have been used in computer systems dedicated to computation or database management. In such systems, requests to the disk drive for input or output of data and processing of the input or output data are all carried out by a general-purpose processor.

Due to the characteristics of the data to be input or output, there is not such a demanding limitation on the time taken in input and output of data as in the case of program and database data. However, in many cases, even a single error may render the rest of the data meaningless even when they are correctly read.

For these reasons, the disk drive of the prior art is designed to make retrials of reading data over a considerable length of time (several seconds to ten seconds per sector), in case an error cannot be corrected. In a case where the data cannot be read after retrials of reading, and the error processing means has determined that a data error occurred, output of the data is interrupted and an interrupt request is placed on the general-purpose processor, that has made the output request, thereby to notify the occurrence of error thereto.

In recent years, increase in the data storage capacity of the disk drive and the advancements in the compression technology for moving picture data have led to the development of many systems such as video servers that store audio and video data on disk drives.

The audio and video data have two features distinct from the data handled in the conventional computer systems. The first feature is that there is a limitation on the time that is allowed for the input/output from/to the disk (recording medium) when recording a broadcast program or reproducing the data on a TV monitor. That is, it is not allowed to make many attempts to read data. Another feature is that the presence of uncorrectable error does not make it meaningless to read the rest of the data, because disturbance due to the data error is restricted within the vicinity of the erroneous data.

Recently, from the point of view described above, such improvements of the disk drive have been studied as (a) to provide a function for specifying from the outside a maximum limit to the time taken for input/output including retrials of reading; (b) to eliminate the function that stops the input/output in the event of data error; and (c) to eliminate the function that omits output of data which include data error.

With the function mentioned in (b), when data that have been read include an error, the data including the error are not output to the outside of the disk drive. But even in this case, reading operation is not stopped and the subsequent data are read with only such data that do not include error being output.

The reason why the function mentioned in (c) is being studied is that a decoder for moving picture or audio data has a function to process data errors, and therefore reproduced data with less deterioration in quality may often be achieved by processing the entire data including errors, than omitting the data that include errors from the processing operation with the function mentioned in (b). In the case of the function mentioned in (c), however, it is difficult to precisely estimate the effect of an error inside of the disk drive, because the extent of the effect varies depending on which part of MPEG (Moving Picture Experts Group) data includes the error and on the length of the data including the error.

Improvements being studied for the storage of audio or moving picture data include, besides those described above, such a constitution as processing of the audio and moving picture data is assigned to a dedicated processor, because a large amount of audio or moving picture data must be processed without interrupt. In this case, a general-purpose processor is required to only make input and output requests to the disk drive. The output data are input to the dedicated processor without being processed in the general-purpose processor.

An example of processor dedicated for the processing of audio or moving picture data is the MPEG2 (Moving Picture Experts Group phase 2) decoder. The MPEG technology compresses video data by eliminating the redundancy in space domain and time domain. To eliminate the redundancy in time domain, in particular, moving picture data are divided into sets of still picture frames, each set consisting of a plurality of still picture frames of which one frame is compressed as a still picture while the other frames are compressed by extracting only the differential information among the frames. The MPEG decoder reproduces the original moving pictures from the MPEG data.

There are a filter and/or a dedicated communication processor installed between the disk drive and the MPEG decoder. As an example of such dedicated processor, a filter processor is disclosed in Japanese Patent Laid-Open Publication No. Hei 03-235589. The filter processor discriminates valid data packets which are necessary for reproduction and invalid data packets which are not necessary for reproduction, among the train of packets of moving picture or audio data that has been received through communication, and removes the invalid packets to reduce the amount of data, thereby increasing the equivalent length of time of the data that can be recorded on the disk.

The filter processor records the number of invalid packets, which have been removed, on the recording apparatus while being appended to the valid packets and, when retrieving the data from the recording apparatus, transmits the data while inserting the recorded number of empty packets between valid packets. This makes it possible to transmit the valid packets at the same time intervals as in receiving.

When the functions mentioned in (a) through (c) are provided, however, frequency of occurrence of data errors increases due to the function of (a), and therefore it is expected that data that include missing data or mutation error would be output as in the functions of (b) and (c) every time the data error occurs. Thus such a trouble is expected to occur even in the dedicated processor described above, that the input of such data leads to malfunction and results in the reproduction of moving picture or audio data being interrupted.

In the case of the filter processor described above, for example, when data which have been read from the disk drive include error and there is an error in the portion of the number of invalid data packets that has been counted when receiving, there is a possibility of such problems that a number of empty packets are sent or, conversely, a number of valid packets are sent simultaneously in a burst.

When such a trouble occurs, in a case where data are input to an apparatus provided with an MPEG decoder, picture or sound may be interrupted, such troubles may be caused as the received data cannot be decoded resulting in missing picture or sound during reproduction, or generation of noise.

Also in a case where an improved disk drive provided with the functions mentioned in (a) through (c) is used, an error occurring in a disk is notified only to the general-purpose processor and is, after being processed by a program on the general-purpose processor, notified to the dedicated processor.

Specifically, the notification is made in the following procedure.

First, when an error occurs in the disk drive, the disk drive having the function of (a) continues the reading of data and stops after completing the reading of all data to be read, in contrast to the disk drive of the prior art which would interrupts the reading of data.

Completion of the reading command is notified to the general-purpose processor using an interrupt signal line. The general-purpose processor carries out the ongoing program process up to a convenient point and, after storing the values of internal registers in memory, calls an interrupt processing program.

The interrupt processing program sends a status read command to the disk drive for the purpose of identifying the cause of interrupt, and receives status information. When it is determined from the status information that a data error has occurred during execution of the read command, the general-purpose processor notifies the dedicated processor that there is an error in the data.

Thus often it takes many steps for an error notification to be transmitted from the disk drive to the dedicated processor. In a case where the dedicated processor receives data including the error before receiving the error notification, the dedicated processor may malfunction as described above. To prevent the malfunction, it is necessary to delay the data transmission by adding a new or an additional FIFO (first-in, first-out) memory in a path between the disk drive and the dedicated processor where data are transferred.

The time taken to notify the existence of error by the program can be made shorter by using a realtime OS (Operating System), which is specialized in interrupt processing, as the basic software. However, a graphical user interface is indispensable for an apparatus that handles moving picture or audio data, while most of realtime operating systems do not provide satisfactory environment for developing graphical user interface.

On the other hand, basic software that is suitable for developing graphical user interface is slow in triggering interrupt processing at present, and the time taken to notify the occurrence of error may be very long.

SUMMARY OF THE INVENTION

An object of the present invention is to provide a recording apparatus, a recording system and an error notification method that are capable of transmitting data error to a dedicated processor without the aid of a general-purpose processor.

According to one aspect of the present invention, a recording apparatus comprises a recording medium, an error correction circuit and an error processing circuit. The error correction circuit corrects errors in read data which are read from the recording medium. The error processing circuit inserts a data pattern in data which are output from the error correction circuit in a case where a missing error or a mutation error remains in the data. The data pattern indicates that the missing error or the mutation error remains.

According to another aspect of the present invention, a recording system provided with the above-described recording apparatus comprises an error detection circuit and a processor. The error detection circuit notifies occurrence of the missing error or the mutation error when the data pattern is detected in output data which are output from the recording apparatus. A processor processes the output data in accordance with the missing error or the mutation error.

According to another aspect of the present invention, an error notification method for a recording apparatus provided with a recording medium and an error correction circuit which corrects errors in read data which are read from the recording medium comprises the step of inserting a data pattern in data which are output from the error correction circuit in a case where a missing error or a mutation remains in the data. The data pattern indicates the missing error or the mutation error remains.

According to the present invention, in case data that have been read from the recording medium include a missing error or a mutation error that cannot be corrected in the error correction circuit, the error processing circuit inserts the predetermined data pattern in the read data. As a result, the data pattern indicating the location of the error, for example, is detected by the error detection circuit and the output data from the recording apparatus is processes by the processor, so that the occurrence of the error is recognized in the recording system. Also in the event of error occurrence, disturbance may be minimized by performing a proper error processing operation in accordance with the location of error and/or the internal state of the processor.

The data pattern may be inserted, for example, at the head or the end of the portion that includes the error. Or, alternatively, information indicating the length of the portion that includes the error may be added at the head or the end of the portion that includes the error, or the data pattern may be inserted at equal intervals in the portion that includes the error.

Also it is made possible for the dedicated processor to select more appropriate process by inserting different data patterns depending on whether the error is a missing error or a mutation error.

Thus in a case where the output data from the error correction circuit includes a missing error or a mutation error remaining therein, the data error that occurred in the recording apparatus can be transmitted to a dedicated processor without the aid of a general-purpose processor, by inserting a predetermined data pattern that indicates the missing error or mutation error with the same size as that of the missing error or mutation error, for example, repetitively thereby providing the output thereof.

Further, the notification method described above for notifying data error to the processor may be switched in accordance with the read data. This makes it possible to store a plurality of kinds of data that would have been processed by processors of different types in the same recording apparatus.

BRIEF DESCRIPTION OF THE DRAWINGS

FIG. 4 is a block diagram showing the constitution of the controller 4 in the second embodiment.

FIG. 5 shows an embodiment of bit assignment of an output mode setting register 50 shown in FIGS. 3 and 4.

DETAILED DESCRIPTION OF THE PREFERRED EMBODIMENT

Figure 1:
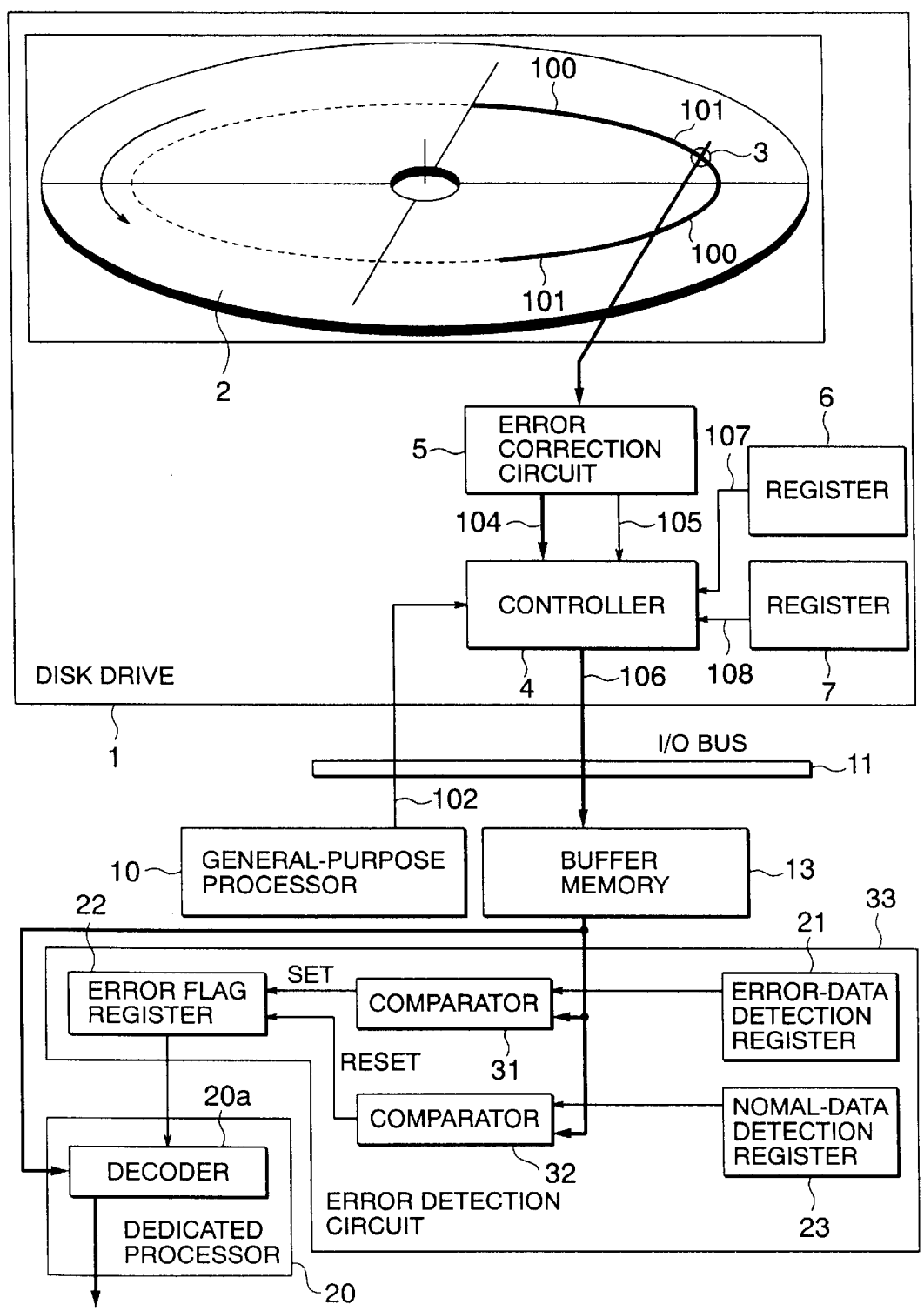
FIG. 1 is a block diagram showing the constitution of a recording system according to a first embodiment of the present invention.
Figure 2:
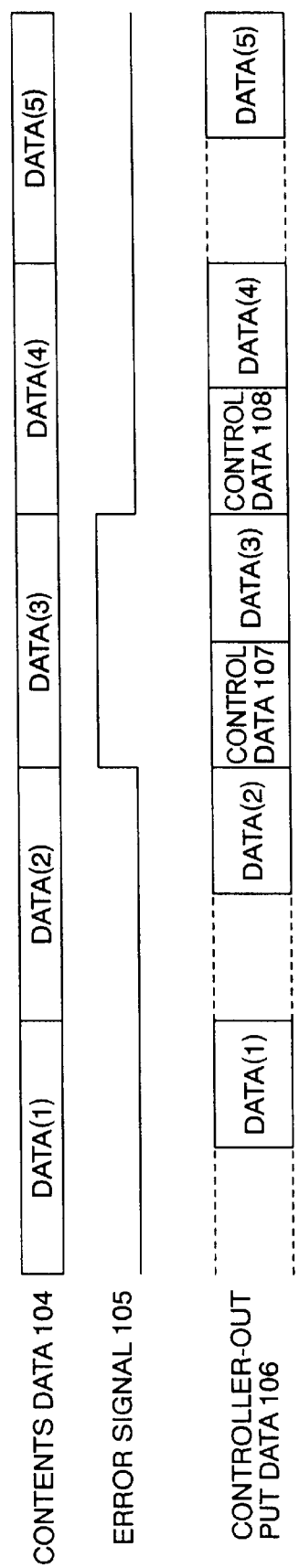
FIG. 2 is a timing chart showing the operation of the recording system according to the first embodiment of the present invention.

Now the preferred embodiments of the present invention will be described below with reference to the accompanying drawings. FIG. 1 is a block diagram showing the constitution of the recording system according to the first embodiment of the present invention, and FIG. 2 is a timing chart showing the operation of the recording system according to the first embodiment of the present invention.

The disk drive 1 has a rotatable recording medium 2 provided therein, with contents data 100 and error control code (ECC) 101 are recorded alternately on the recording medium 2. A head 3 writes data in a specified recording area (sector) of the recording medium 2, and reads data from a specified sector.

A general-purpose processor (command outputting means) 10 outputs a read command 102 via an I/O (input/output) bus 11 to a controller (error processing circuit) 4 of the disk drive 1.

The controller 4 reads the contents data 100 and the error control code 101 from the recording area (sector) of the recording medium 2 specified by the read command 102. An error correction circuit 5 checks the contents data 100 by means of the error control code 101 and, when an error is found, outputs the data as data 104 (data (1) through (5)) after correcting the error as far as possible. When the error cannot be corrected, the error correction circuit 5 outputs an error signal 105.

Upon input of the data 104, the controller 4 transfers the data 104 as data 106 via the I/O bus 11 to a buffer memory 13 that is connected between an error detection circuit 33 therewith. When the error signal 105 is input, on the other hand, the controller 4 transfers a control data pattern 107 that has been stored in a register 6 in advance and a data pattern 108 that has been stored in a register 7 in advance as the data 106 via the I/O bus 11 to the buffer memory 13.

In the error detection circuit 33, the data 106 are compared by the comparators 31 and 32 with output signals from an error-data detection register and a normal-data detection register. A data pattern that shows the data 106 include an error is stored in the register 21 in advance. A data pattern that shows the data 106 include no error is stored in the register 23 in advance. Therefore, if the data 106 agree with the data pattern stored in the register 21, an error flag register 22 is set by the comparator 31, if the data 106 agree with the data pattern stored in the register 23, the error flag register 22 is reset by the comparator 32. A decoder 20a provided in a dedicated processor 20 reads and processes the data 106 that have been transferred to the buffer memory 13 sequentially.

At this time, if the error flag register has been set, the data 106 that have been read from the disk drive 1 are processed as data that include error. On the other hand, if the data that have been read from the disk drive 1 agree with the data pattern stored in the register 23, the data that have been read from the disk drive 1 are processed as data that do not any include error.

Figure 3:
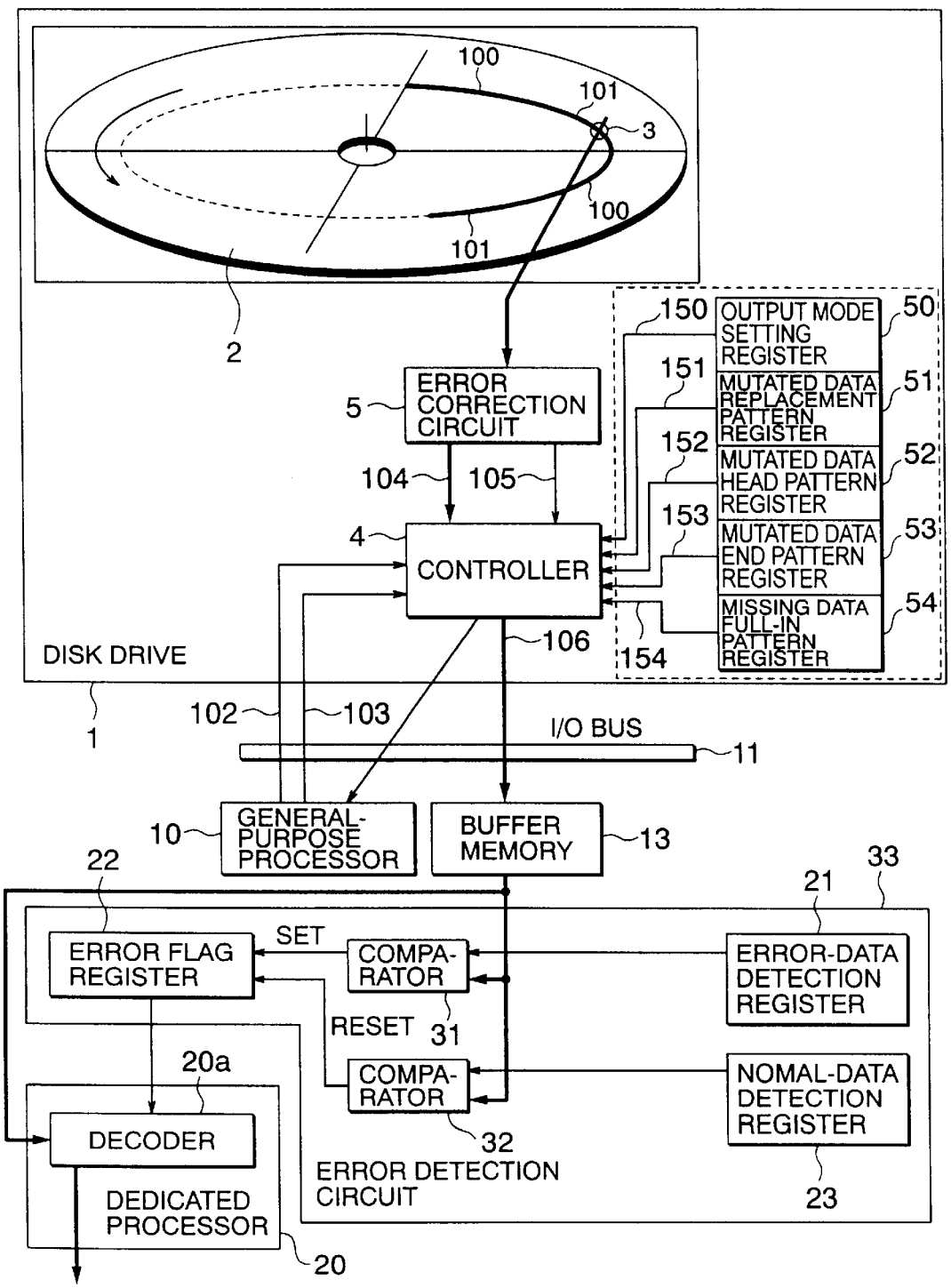
FIG. 3 is a block diagram showing the constitution of a recording system according to a second embodiment of the present invention.

The second embodiment of the present invention will be described below. In the second embodiment, in a case where the data that have been read include an error such as missing error or mutation error, the controller 4 determines what type of data should be output. FIG. 3 is a block diagram showing the constitution of a recording system according to the second embodiment of the present invention. FIG. 4 is a block diagram showing the constitution of the controller 4 in the second embodiment.

In the second embodiment, the disk drive 1 has an output mode setting register 50 that stores the information indicating what type of error notification method is selected. The disk drive 1 also has a mutated data replacement pattern register 51, a mutated data head pattern register 52, a mutated data end pattern register 53 and a missing data fill-in pattern register 54. These registers 51 through 54 store data patterns that are specified for the respective error notification methods.

The mutated data replacement pattern register 51 is a register that is used, when mutated data is detected, for storing a value to replace the mutated data, namely a mutated data replacement pattern 151. The mutated data head pattern register 52 is a register that is used, when mutated data is detected, for storing a value to be inserted at the head of a range of data that is suspected to include the mutation error, namely a mutated data head pattern 152. The mutated data end pattern register 53 is a register that is used, when mutated data is detected, for storing a value to be inserted at the end of a range of data that is suspected to include the mutation error, namely a mutated data end pattern 153. The missing data fill-in pattern register 54 is a register that is used, when missing data is detected in the data that have been read, for storing a value of a data pattern to be inserted, if it is intended, namely a missing data fill-in pattern 154.

The output mode setting register 50 uses the values, which are set in the mutated data replacement pattern register 51, the mutated data head pattern register 52, the mutated data end pattern register 53 and the missing data fill-in pattern register 54, to set a value 150 that indicates whether to carry out replacement or insertion of data or not, and whether to interrupt the processing of the command or not in the event of error occurrence.

In the controller 4, an error control command 103 from the general-purpose processor is input to an error controller 163, while the read command from the general-purpose processor is input to a disk controller 162. The value 150 is input to the error controller. The error controller controls an output selector 160 and an input selector 161. The disk controller 162 reads the data from the recording medium 2. If there is data including error that cannot be corrected by the error collection circuit, the error signal is inputted to the error controller 163. The error controller 163 switches the selectors 160 and 161 based on contents of the error and the set value 150. Thus, the data 104 are outputted from the controller 4 as they are, or after deletion of a part thereof or insertion of a pattern from one of the registers 51 through 54 into error generating part.

FIG. 5 shows an embodiment of bit assignment of the output mode setting register 50 shown in FIGS. 3 and 4. The output mode setting register 50 comprises, for example, a 7-bit register having seven bits defined into three groups.

Bit 6 that is the most significant bit holds data indicating the output mode to be used in the event of a read error. In a case where a read error occurs when bit 6 is "0", reading operation is interrupted at a point immediately before the error even when the command has not been completed. In a case where bit 6 is "1", the reading operation is completed upon output of up to the last sector specified by the command, despite read error.

Bit 5 and bit 4, which are the second and third significant bits, hold data indicating the output mode to be used in the event of an error including a missing error. In a case where the data includes a missing error when bit 5 is "0" and bit 4 is "1", one missing data fill-in pattern 154 is inserted. When bit 5 is "1", the missing data fill-in pattern 154 is read from the missing data fill-in pattern register 54 and is inserted repetitively until the size of the missing data is matched, regardless of the value of bit 4. When bit 5 is "0" and bit 4 is "0", the missing data fill-in pattern is not inserted and the data are output as they are.

Bit 3 through bit 0 that are the least significant bits hold data indicating the output mode to be used in the event of an error including a mutation error. In a case where the data includes a mutation error when bit 3 is "0" and bit 2 is "0", then the data are output after removing the portion that includes the mutation error, regardless of the values of bit 1 and bit 0. When bit 3 is "0" and bit 2 is "1", then the entire data including the mutation error are output. At this time, nothing is inserted when bit 1 and bit 0 are "0", the head pattern is inserted when bit 1 is "0" and bit 0 is "1", the end pattern is inserted when bit 1 is "1", and bit 0 is "0", while the head and end patterns are inserted when bit 1 and bit 0 are "1". In a case where bit 3 is "1", the mutated data replacement pattern 151 is read from the mutated data replacement pattern register 51 and the data are output after replacing the data portion that is suspected to include mutation error, regardless of the values of bit 2 through bit 0.

Figure 6:
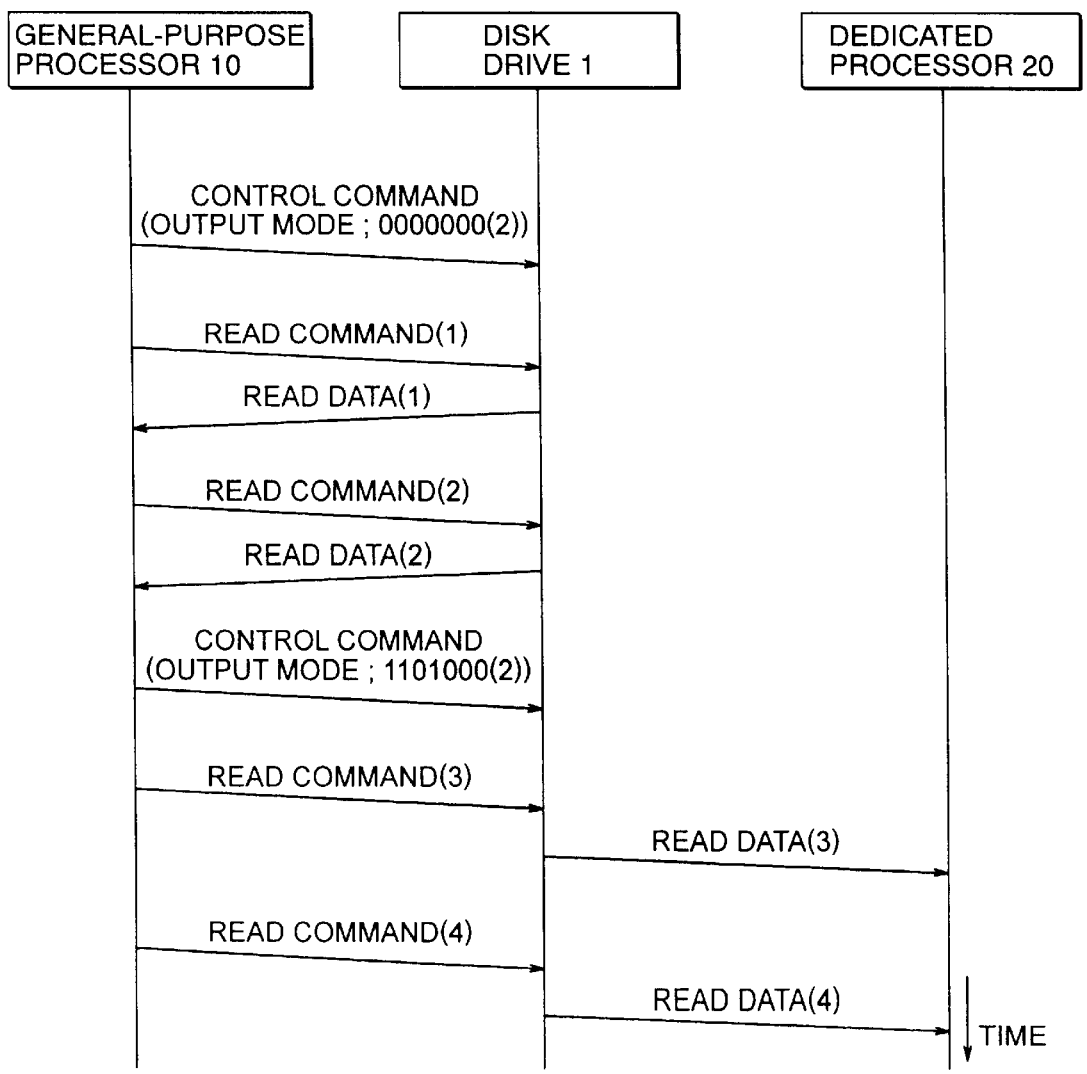
FIG. 6 is a timing chart showing an embodiment of reading operation of a disk drive 1 shown in FIG. 3.

FIG. 6 is a timing chart showing an embodiment of the reading operation of the disk drive 1 shown in FIG. 3. FIG. 6 shows the operation of reading two types of data while switching the output mode shown in FIG. 5, in the second embodiment.

The data set that is read first is processed by the general-purpose processor 10. Accordingly, the general-purpose processor 10 sets a 7-bit binary number "0000000" indicating the error output mode in the output mode setting register 50. The signal "0000000" indicates that the output of data is to be interrupted upon occurrence of an error, as shown in FIG. 5. When data are read in this state, output of data is interrupted upon occurrence of an error, and the execution of the read command is stopped.

The data set that is read next is processed by the dedicated processor 20. Accordingly, the general-purpose processor 10 sets a number "1101000" indicating the error output mode in the output mode setting register 50. The signal "1101000" indicates that output of data is not interrupted when an error occurs, while a portion of missing data is filled in with the missing data fill-in pattern 154 and a portion of data including mutation error is replaced with the mutated data replacement pattern 151, as shown in FIG. 5. When data are read in this state, output of data is not interrupted upon occurrence of an error, and the data are output after inserting the missing data fill-in pattern 154 in the portion of the missing data or replacing the portion of data including mutation error with the mutated data replacement pattern 151.

As will be seen from the sequence, it is made possible to carry out an appropriate error processing operation for the type of data that are read in the disk drive 1, by dynamically changing the output mode setting register 50 shown in FIG. 5. The output mode may also be set by using a bit included in the read command, instead of the control command that is exclusively used for setting as shown in FIG. 5.

These methods may also be combined such as setting the error output modes for two types of data by means of the control command and specifying the type of data with one bit of the read command, or setting two types of read commands according to the type of data.

Besides those described above, a method of automatic switching of the error output mode may be considered. That is, in such a system as all data read from the disk drive 1 are in the form of packets of fixed length and the type of data can be identified by checking the header thereof, the type of data can be determined relatively easily inside of the disk drive 1. Therefore, when the output mode setting registers 50 corresponding to the types of data are provided, the error output mode can be automatically switched in accordance with the type of data in the disk drive 1, without need for the general-purpose processor 10 to change the output mode every time.

Figure 7:
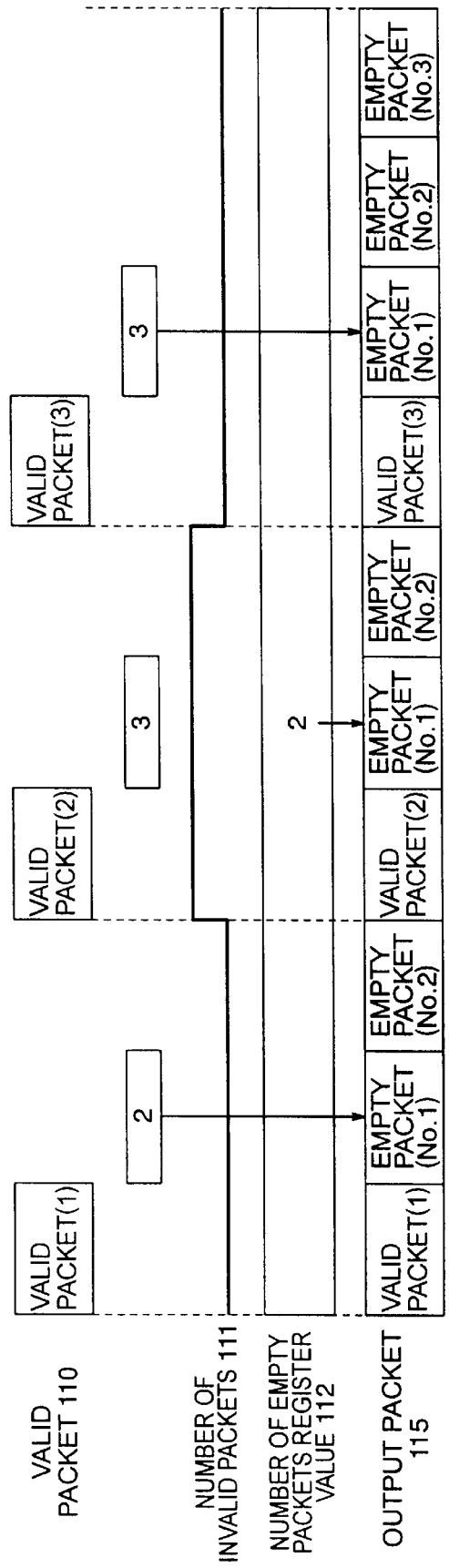
FIG. 7 is a timing chart showing an embodiment of the operation of a dedicated processor that switches the data processing method in accordance with the error notification according to a third embodiment of the present invention.
Figure 8:
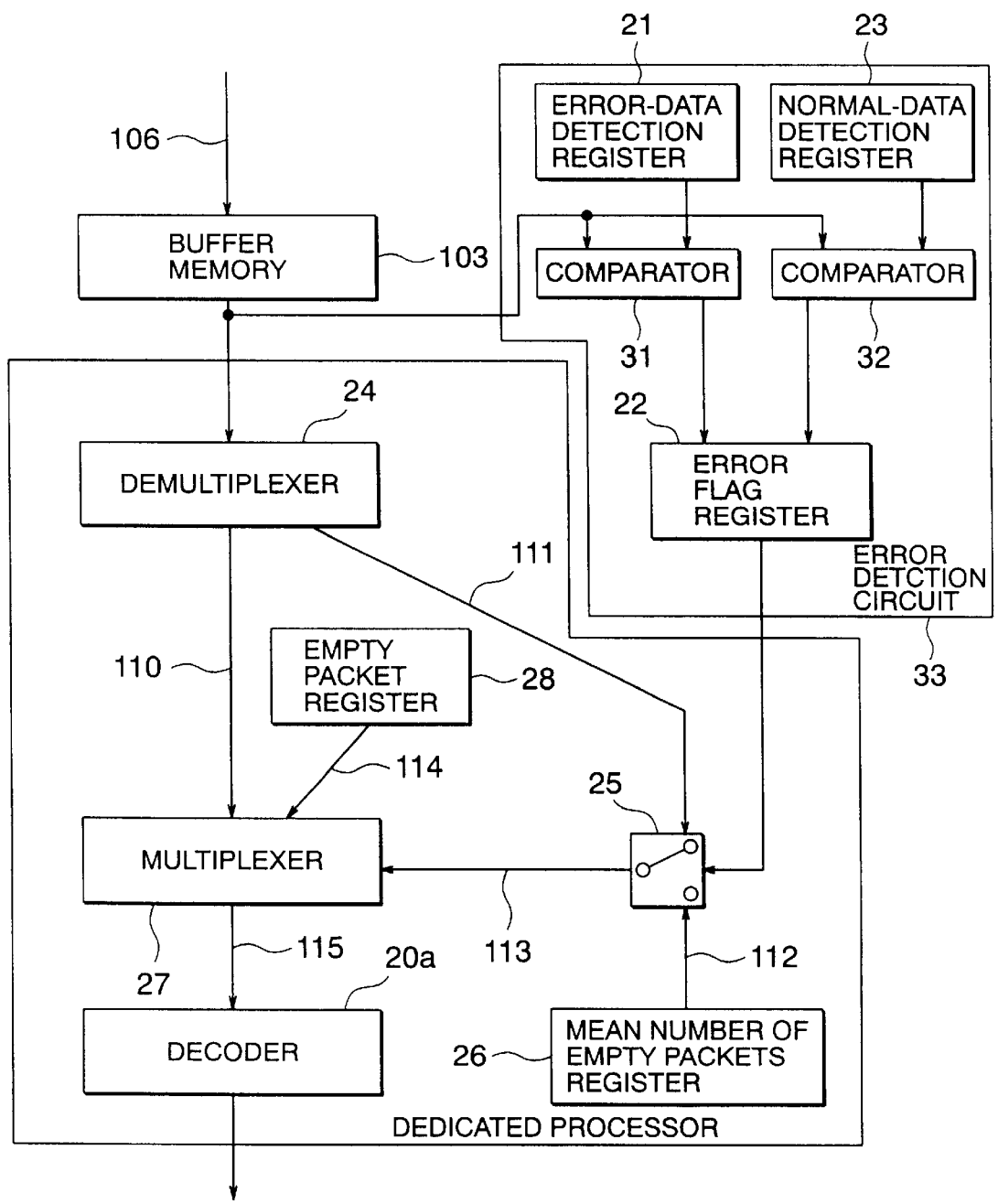
FIG. 8 is a block diagram showing the constitution of a packet filter provided in the recording system according to the third embodiment of the present invention.

Now the third embodiment of the present invention will be described below. The third embodiment is a variation of the first or second embodiment applied to such a packet filter as disclosed in Japanese Patent Laid-Open Publication No. Hei. 3-235589. FIG. 7 is a timing chart showing an embodiment of the operation of a dedicated processor that changes the method of processing data in accordance with an error notification, according to the third embodiment. FIG. 8 is a block diagram showing the constitution of the packet filter provided in the recording system according to the third embodiment of the present invention.

In the third embodiment, the data written on the recording medium 2 in the disk drive 1 has such a structure as valid packets 110 and invalid packets 111 are arranged alternately as shown in FIG. 7. The valid packets 110 and the invalid packets 111, which are output from the disk drive 1, are read alternately from the buffer memory 13. Data 106 read from the buffer memory 13 is separated into the valid packets 110 and the invalid packets 111 by the demultiplexer 24.

While the error flag register 22 is reset, the selector 25 outputs the number of invalid packets 111 that are output from the demultiplexer 24 as empty packets 113 to a multiplexer 27. When the error flag register 22 is set, on the other hand, there is a possibility of the number of invalid packets 111 being erroneous, and therefore the selector 25 outputs the value 112 of a mean number of empty packets register 26 as a temporary value of the number of empty packets 113 to the multiplexer 27.

Every time one valid packet 110 is output, the multiplexer 27 takes the empty packets 114, in the number indicated by the output of the selector 25, from the empty packet register 28 and outputs the empty packets 114.

Thus, when there is no error, the same number of empty packets 114 as the number of invalid packets are inserted between adjacent valid packets, as shown in FIG. 7, and are output as the output packets 115.

When there is an error, a predetermined number of empty packets, for example, two empty packets, are temporarily output between adjacent valid packets. Valid packets 110 are output in the output packets 115 regardless of whether there is an error.

Figure 9:
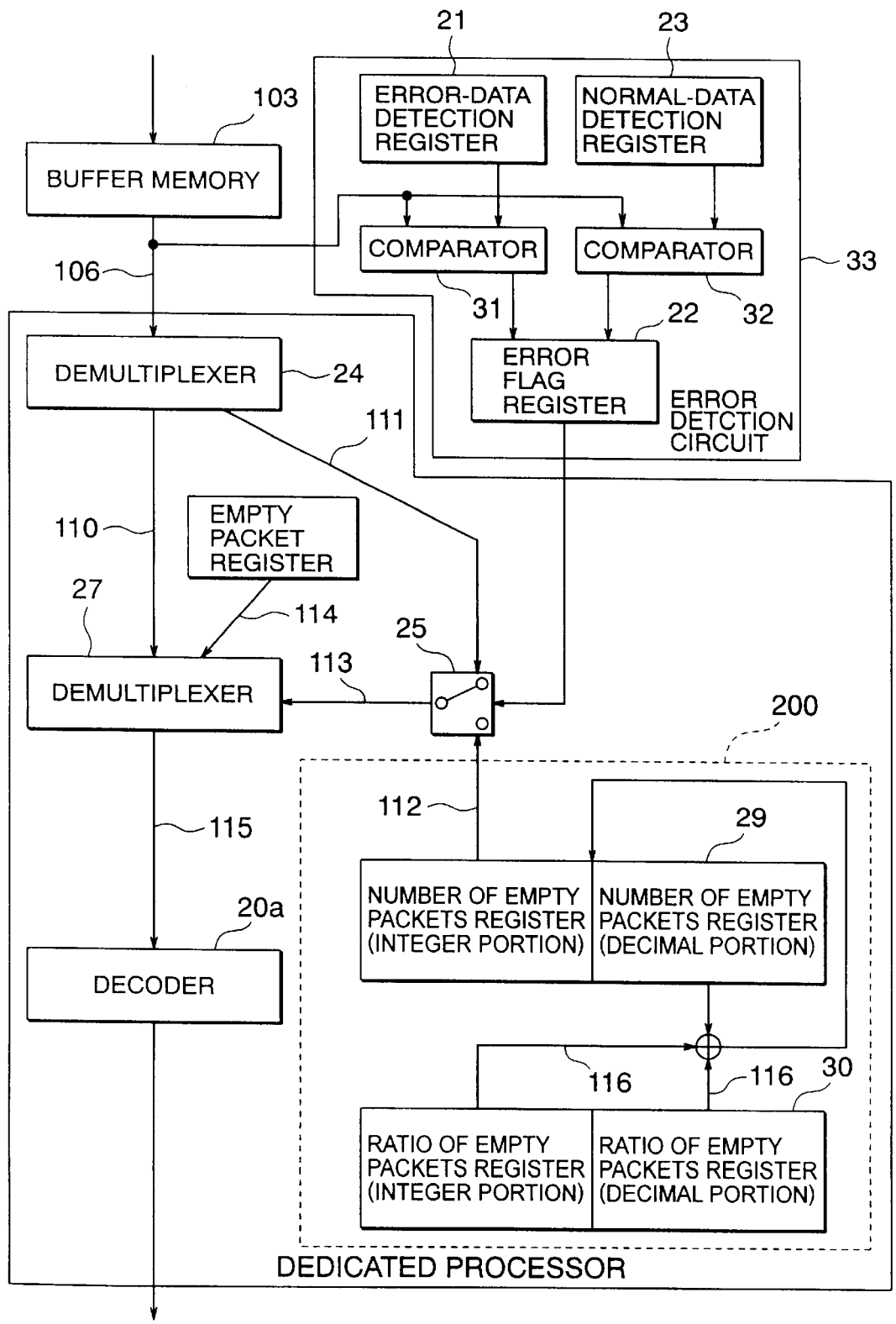
FIG. 9 is a block diagram showing the constitution of a packet filter provided in the recording system according to a fourth embodiment of the present invention.

The fourth embodiment of the present invention will be described below. FIG. 9 is a block diagram showing the constitution of the packet filter provided in the recording system according to the fourth embodiment of the present invention.

The number of empty packets to be inserted is a fixed integer in the third embodiment. In the fourth embodiment, in contrast, a number of empty packets calculating circuit 200 is provided to determine the number of empty packets to be inserted, based on the ratio of the number of invalid packets to the number of valid packets.

An empty packets ratio register 30 in the circuit 200 is a fixed point number register that stores a value 116 indicating the number of empty packets to be inserted as the ratio of the number of invalid packets to the number of valid packets in the form of a fixed point number with the less significant 8 bits being the decimal portion below decimal point. A number of empty packets register 29 in the circuit 200 is also a fixed point number register. When one valid packet is sent, sum of the decimal portion and the value of the empty packets ratio register 30 are substituted in the number of empty packets register 29. As a result, the number of empty packets indicated by the integer portion of the number of empty packets register 29 is sent.

Figure 10:
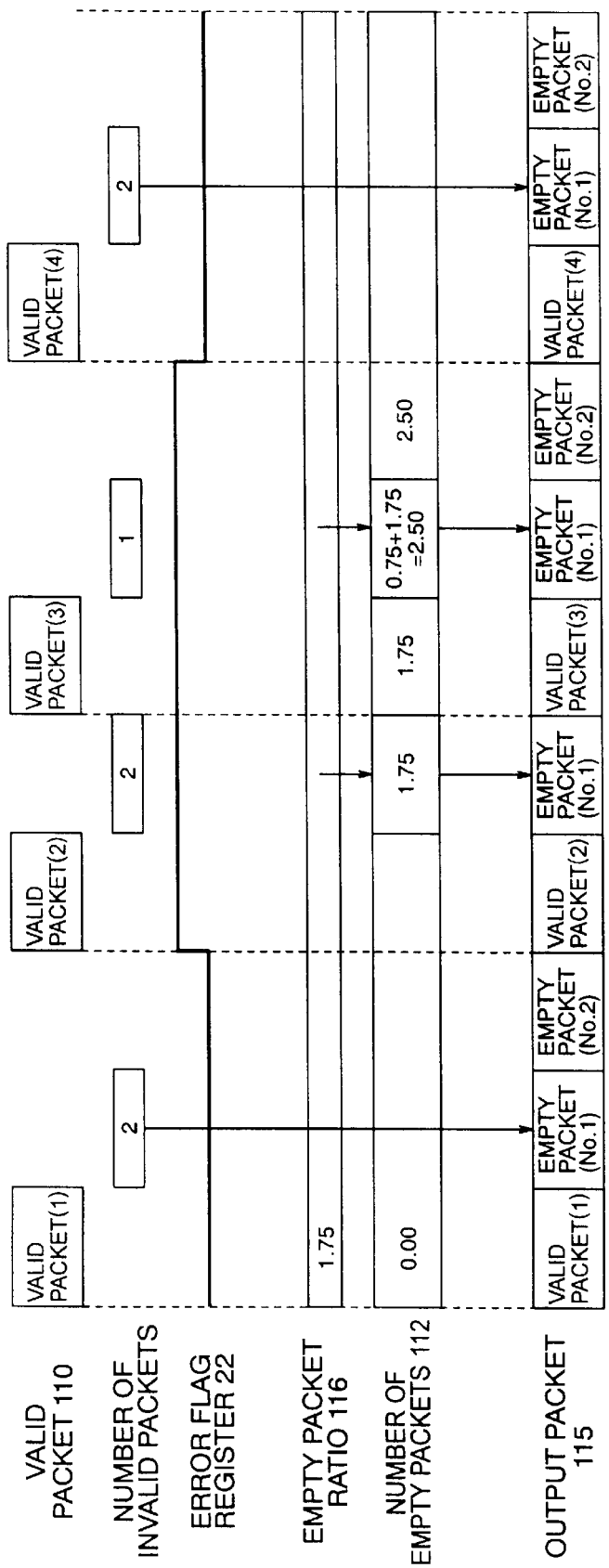
FIG. 10 is a timing chart showing an embodiment of the operation of the packet filter provided in the recording system according to the fourth embodiment of the present invention.

FIG. 10 is a timing chart showing an embodiment of the operation of the packet filter provided in the recording system according to the fourth embodiment of the present invention.

While the error flag register 22 is reset, the number of empty packets 114 indicated by the number of invalid packets 111 are inserted next to the valid packet 110. While the error flag register 22 is set, after the valid packet 110 is sent, the value 116 of the empty packets ratio register 30 is added to the number of empty packets register 29.

In the following description, it will be assumed that a value 1.75 is set in the empty packets ratio register 30. Floating point hexadecimal notation of the value 1.75 is "01C0". It is also assumed that initial setting of the number of empty packets register 29 is "0.0". In this case, initial value of the number of empty packets register 29 becomes 0.00+1.75=1.75. Thus one empty packet is sent from the circuit 200, since the integral portion of 1.75 is 1.

When the next valid packet (3) is output, since the error flag register 22 is still set, sum of the fractional portion of the value of the number of empty packets register 29 and the value of the empty packets ratio register 30 (=0.75+1.75= 2.50) is stored in the number of empty packets register 29. Accordingly, two empty packets are inserted corresponding to the value of the integral portion of the number of empty packets register 29.

The dedicated processor (packet filter) described above outputs all valid packets as they are, regardless of whether there is an error or not. This operation does not result in any problem because an ordinary MPEG decoder has a function to detect errors included in a train of packets by checking the MPEG data structure or the like, and process the errors.

Figure 11:
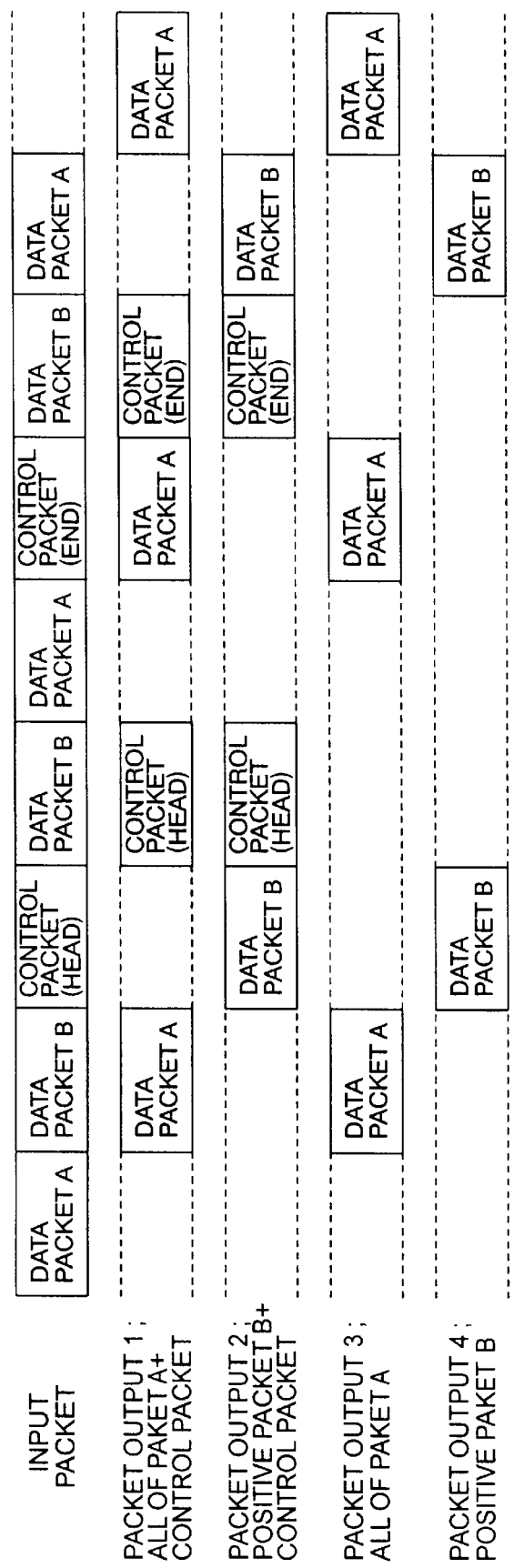
FIG. 11 is a timing chart showing an embodiment of the operation of a demultiplexer that classifies packets in a dedicated processor provided in a recording system according to a fifth embodiment of the present invention.
Figure 12:
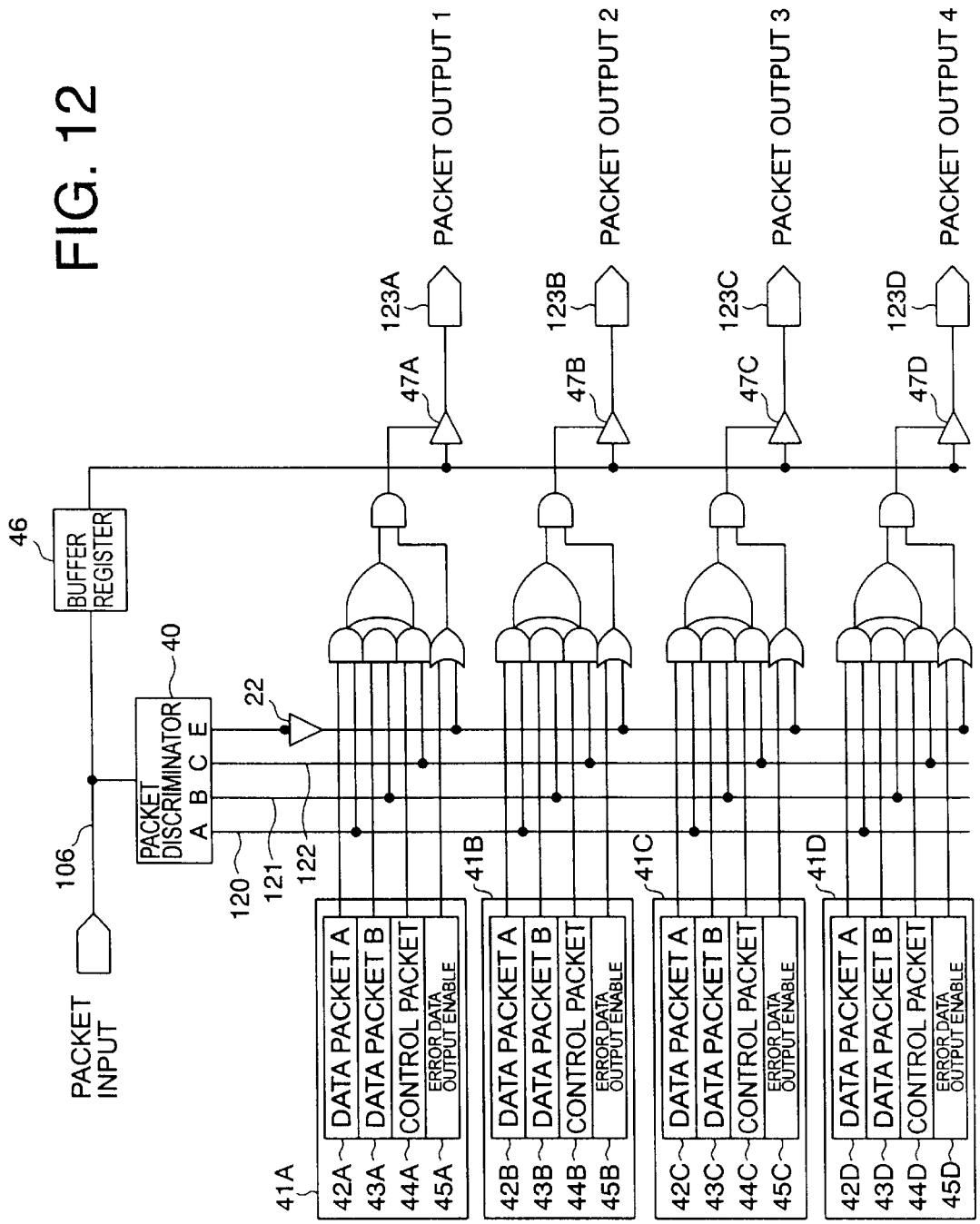
FIG. 12 is a block diagram showing the constitution of the demultiplexer provided in the recording system according to the fifth embodiment of the present invention.

The fifth embodiment will be described below. In the fifth embodiment, whether data packet that may include an error should be output or not can be specified, as well as the type of packet (data packet, control packet that is output from the disk drive 1 (control data patterns 107, 108 of FIG. 1)) can be selected as the condition for the dedicated processor to output packets. FIG. 11 is a timing chart showing an embodiment of the operation of a demultiplexer that classifies packets in the dedicated processor provided in the recording system according to the fifth embodiment of the present invention. FIG. 12 is a block diagram showing the constitution of the demultiplexer provided in the recording system according to the fifth embodiment of the present invention.

A packet discriminator 40 determines the type of packet by checking the header of data (input packet) 106 that is read from the buffer memory 13 shown in FIG. 1, and accordingly sets a corresponding packet detection signal (a packet A detection 120, a packet B detection 121, or a control packet detection 122).

When the packet discriminator 40, upon detection of the control data pattern (control packet) 107 that indicates the start of error data as shown in FIG. 1, sets the error flag register 22. The packet discriminator 40, upon detection of the control data pattern (control packet) 108 that indicates the end of error data, then the error flag register 22 is reset.

Selection registers 41A through 41D hold data that indicate what kind of packet should be output at each output terminal. The selection registers 41A through 41D have packet selection registers that designate the output packets, namely packet A selection registers 42A through 42D, packet B selection registers 43A through 43D, and control packet selection registers 44A through 44D. The selection registers 41A through 41D further have error output enable registers 45A through 45D that specify whether packet that may include an error should be output or not.

A buffer register 46 outputs a packet after causing a delay of time that is necessary for the packet discriminator 40 to identify the type of packet that has been read from the buffer memory 13 by the packet discriminator 40.

When any of the logical products of the values of the packet A selection registers 42A through 42D, the packet B selection registers 43A through 43D, and the control packet selection registers 44A through 44D in the packet selection registers 41A through 41D, which are output from the packet discriminator 40 and correspond to the packet detection signals 120 through 122, is true, and the logical sum of the negation of the error flag register 22 and the error output enable register 45A through 45D is true (either the packet does not include an error or can be output even when including error), then the buffers 47A through 47D output the data which are output from the buffer register 46 as packet outputs 123A through 123D (packet outputs 1 through 4).

States of the selection registers 41A through 41D during the operation shown in FIG. 11 are as follows.

For the packet output 1, the packet A selection register 42A, the control packet selection register 44A and the error output enable register 45A are set, while the packet B selection register 43A is reset in the selection register 41A.

For the packet output 2, the packet B selection register 43B and the control packet selection register 44B are set, while the packet A selection register 42B and the error output enable register 45B are reset in the selection register 41B. There is a possibility that a negative packet B includes an error.

For the packet output 3, the packet A selection register 42C and the error output enable register 45C are set, while the packet B selection register 43C and the control packet selection register 44C are reset in the selection register 41C.

For the packet output 4, the packet B selection register 43D is set, while the packet A selection register 42D, the control packet selection register 44D and the error output enable register 45D are reset in the selection register 41D. There is a possibility that a negative packet B includes an error.

Figure 13:
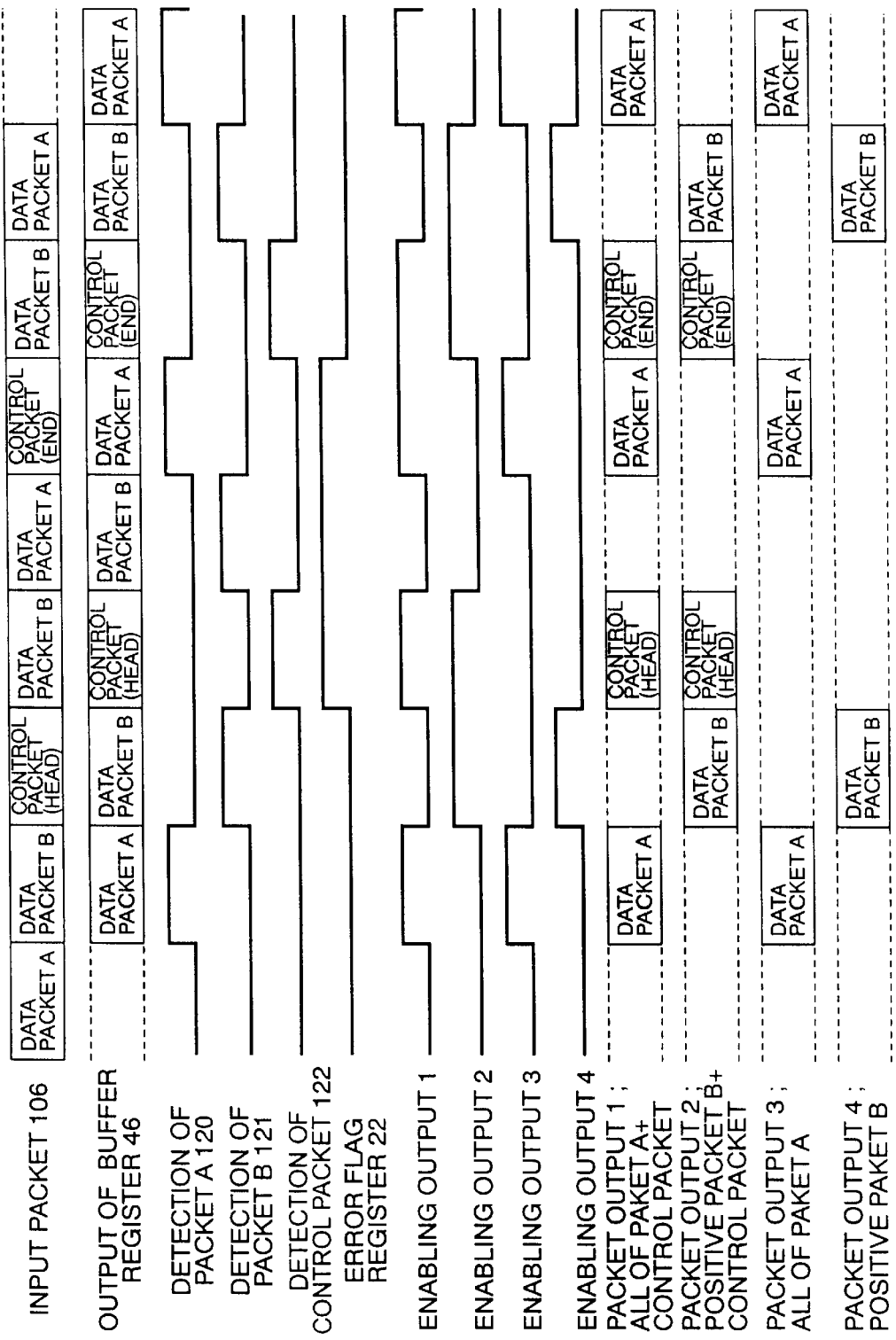
FIG. 13 is a timing chart showing an embodiment of the internal operation of the demultiplexer in the fifth embodiment of the present invention.

FIG. 13 is a timing chart showing an embodiment of the internal operation of the demultiplexer in the fifth embodiment of the present invention. Shown in FIG. 13 are the states of the packet detection signals 120 through 122, which are output signals indicating the results of check by the packet discriminator 40, and the timing of generating the output enable signals for the buffers 47A through 47D in accordance with the error flag register 22 and the selection registers 41A through 41D during the operation shown in FIG. 11.

In a case where the data that are read from the disk drive 1 include missing error or mutation error, the occurrence of the error can be notified directly to the dedicated processor 20 that processes the read data.

Therefore, while the disk drive of the prior art places an interrupt request on the general-purpose processor to stop other processes and triggers the process of notifying the error to the dedicated processor, the present embodiment makes this operation unnecessary. As a result, the occurrence of error can be notified to the dedicated processor more quickly.

What is claimed is:

1. A recording apparatus comprising:
    a recording medium;
    an error correction circuit which corrects errors in read data which are read from said recording medium; and
    an error processing circuit which inserts a data pattern in data which are output from said error correction circuit in a case where a missing error remains in said data, said data pattern indicating that said missing error remains.

2. The recording apparatus according to claim 1, wherein said error processing circuit inserts said data pattern in said data repetitively until a size of data after said data pattern is inserted matches a size of data in a state of not including said missing error in said case.

3. The recording apparatus according to claim 1, wherein said error processing circuit inserts a data pattern which indicates a size of said missing error in a case where said missing error remains.

4. The recording apparatus according to claim 1, wherein said error processing circuit changes an error output mode which indicates whether said data pattern should be output or not, according to type of said read data in said case.

5. The recording apparatus according to claim 4, wherein said error processing circuit changes said error output mode according to an error control subcommand which is included in an external command and instructs to change said error output mode.

6. The recording apparatus according to claim 4, further comprising an error output mode memory circuit which stores said error output mode which is set in accordance with said type of said read data, wherein said error processing circuit changes said error output mode by making reference to said error output mode memory circuit based on data type information which is included in an external command and indicates said type of said read data.

7. The recording apparatus according to claim 4, further comprising:
    a data discrimination circuit which identifies said type of said read data; and
    an error output mode memory circuit which stores said error output mode which is set in accordance with said type of said read data,
    wherein said error processing circuit changes said error output mode by making reference to said error output mode memory circuit based on a result of identification by said data discrimination circuit.

8. A recording system provided with said recording apparatus according to claim 1, comprising:
    an error detection circuit which notifies occurrence of said missing error when said data pattern is detected in output data which are output from said recording apparatus; and a processor which processes said output data in accordance with said missing error.

9. The recording system according to claim 8, wherein said error processing circuit inserts said data pattern in said data repetitively until a size of data after said data pattern is inserted matches a size of data in a state of not including said missing error in said case.

10. The recording system according to claim 8, wherein said error processing circuit inserts a data pattern which indicates a size of said missing error in said case.

11. The recording system according to claim 10, wherein said error detection circuit detects a size of said missing error, and said processor processes said output data in accordance with said size of said missing error.

12. The recording system according to claim 8, wherein said error processing circuit changes an error output mode which indicates whether said data pattern should be output or not, according to type of said read data in a case where said read data include an error.

13. The recording system according to claim 12, wherein said error processing circuit changes said error output mode according to an error control subcommand which is included in an external command and instructs to change said error output mode.

14. The recording system according to claim 13, wherein said recording apparatus comprises an error output mode memory circuit which stores said error output mode which is set in accordance with said type of said read data, and said error processing circuit changes said error output mode by making reference to said error output mode memory circuit based on data type information that is included in an external command and indicates said type of said read data.

15. The recording system according to claim 13, wherein said recording apparatus comprises:

a data discrimination circuit which identifies said type of said read data; and an error output mode memory circuit which stores said error output mode which is set in accordance with said type of said read data, and said error processing circuit changes said error output mode by making reference to said error output mode memory circuit based on a result of identification by said data discrimination circuit.

16. A recording apparatus comprising:

a recording medium;

an error correction circuit which corrects errors in read data which are read from said recording medium; and an error processing circuit which inserts a data pattern in data which are output from said error correction circuit in a case where a mutation error remains in said data, said data pattern indicating said mutation error remains.

17. The recording apparatus according to claim 16, wherein said error processing circuit replaces data including said mutation error with a predetermined replacement pattern in said case.

18. The recording apparatus according to claim 16, wherein said error processing circuit inserts said data pattern at least at one of positions immediately before and in data including said mutation error in said case.

19. The recording apparatus according to claim 16, wherein said error processing circuit inserts said data pattern which indicates occurrence of said mutation error and a size of data including said mutation error at least at one of positions immediately before and in said data including said mutation error in said case.

20. The recording apparatus according to claim 16, wherein said error processing circuit changes an error output mode which indicates whether said data pattern should be output or not, according to type of said read data in a case where said read data include an error.

21. The recording apparatus according to claim 20, wherein said error processing circuit changes said error output mode according to an error control subcommand which is included in an external command and instructs to change said error output mode.

22. The recording apparatus according to claim 20, further comprising an error output mode memory circuit which stores said error output mode which is set in accordance with said type of said read data, wherein said error processing circuit changes said error output mode by making reference to said error output mode memory circuit based on data type information which is included in an external command and indicates said type of said read data.

23. The recording apparatus according to claim 20, further comprising:

a data discrimination circuit which identifies said type of said read data; and an error output mode memory circuit which stores said error output mode which is set in accordance with said type of said read data, wherein said error processing circuit changes said error output mode by making reference to said error output mode memory circuit based on a result of identification by said data discrimination circuit.

24. A recording system provided with the recording apparatus according to claim 16, comprising:

an error detection circuit which notifies occurrence of said mutation error when said data pattern is detected in output data which are output from said recording apparatus; and a processor which processes said output data in accordance with said mutation error.

25. The recording system according to claim 24, wherein said error processing circuit replaces data including said mutation error with a predetermined replacement pattern in said case.

26. The recording system according to claim 24, wherein said error processing circuit inserts said data pattern at least at one of positions immediately before and in data including said mutation error in said case.

27. The recording system according to claim 24, wherein said error processing circuit inserts said data pattern which indicates occurrence of said mutation error and a size of data including said mutation error at least at one of positions immediately before and in data including said mutation error in said case.

28. The recording system according to claim 27, wherein said error detection circuit detects a size of mutated data, and said processor processes said output data in accordance with said size of said mutated data.

29. The recording system according to claim 24, wherein said error processing circuit changes an error output mode which indicates whether said data pattern should be output or not, according to type of said read data in a case where said read data include an error.

30. The recording system according to claim 29, wherein said error processing circuit changes said error output mode according to an error control subcommand which is included in an external command and instructs to change said error output mode.

31. The recording system according to claim 29, wherein said recording apparatus comprises an error output mode memory circuit which stores said error output mode which is set in accordance with said type of said read data, and said error processing circuit changes said error output mode by making reference to said error output mode memory circuit based on data type information that is included in an external command and indicates said type of said read data.

32. The recording system according to claim 29, wherein said recording apparatus comprises:
   a data discrimination circuit which identifies said type of said read data; and
   an error output mode memory circuit which stores said error output mode which is set in accordance with said type of said read data, and
   said error processing circuit changes said error output mode by making reference to said error output mode memory circuit based on a result of identification by said data discrimination circuit.

33. An error notification method for a recording apparatus provided with a recording medium and an error correction circuit which corrects errors in read data which are read from said recording medium, comprising the step of:
   inserting a data pattern in data which are output from said error correction circuit in a case where a missing error remains in said data, said data pattern indicating said missing error remains.

34. The error notification method according to claim 33, wherein the step of inserting said data pattern comprises the step of inserting said data pattern in said data repetitively until a size of data after said data pattern is inserted matches a size of data in a state of not including said missing error.

35. The error notification method according to claim 33, wherein the step of inserting said data pattern comprises the step of inserting a data pattern which indicates a size of said missing error.

36. The error notification method according to claim 33, further comprising the step of changing an error output mode which indicates whether said data pattern should be output or not, according to type of said read data in a case where said read data include an error.

37. The error notification method according to claim 36, wherein the step of changing said error output mode comprises the step of changing said error output mode according to an error control subcommand which is included in an external command and instructs to change said error output mode.

38. The error notification method according to claim 36, wherein the step of changing said error output mode comprises the step of changing said error output mode by making reference to an error output mode memory circuit which stores said error output mode which is set in accordance with said type of said read data based on data type information which is included in an external command and indicates said type of said read data.

39. The error notification method according to claim 36, wherein the step of changing said error output mode further comprises the steps of:
   identifying said type of said read data; and
   changing said error output mode by making reference to an error output mode memory circuit which stores said error output mode which is set in accordance with said type of said read data based on a result of said identifying.

40. An error notification method for a recording apparatus provided with a recording medium and an error correction circuit which corrects errors in read data which are read from said recording medium, comprising the step of:
   inserting a data pattern in data which are output from said error correction circuit in a case where a mutation error remains in said data, said data pattern indicating said mutation error.

41. The error notification method according to claim 40, wherein the step of inserting said data pattern comprises the step of replacing data including said mutation error with a predetermined replacement pattern.

42. The error notification method according to claim 40, wherein the step of inserting said data pattern comprises the step of inserting said data pattern at least at one of positions immediately before and in data including said mutation error.

43. The error notification method according to claim 40, wherein the step of inserting said data pattern comprises the step of inserting said data pattern which indicates occurrence of said mutation error and a size of data including said mutation error at least at one of positions immediately before and in said data including said mutation error.

44. The error notification method according to claim 40, further comprising the step of changing an error output mode which indicates whether said data pattern should be output or not, according to type of said read data in a case where said read data include an error.

45. The error notification method according to claim 44, wherein the step of changing said error output mode comprises the step of changing said error output mode according to an error control subcommand which is included in an external command and instructs to change said error output mode.

46. The error notification method according to claim 45, wherein the step of changing said error output mode comprises the step of changing said error output mode by making reference to an error output mode memory circuit which stores said error output mode which is set in accordance with said type of said read data based on data type information which is included in an external command and indicates said type of said read data.

47. The error notification method according to claim 45, wherein the step of changing said error output mode further comprises the steps of:
   identifying said type of said read data; and
   changing said error output mode by making reference to an error output mode memory circuit which stores said error output mode which is set in accordance with said type of said read data based on a result of said identifying.

* * * * *